United States Patent [19]

Kellar

[11] 4,360,831

[45] Nov. 23, 1982

[54] MULTIPLE IMAGE DIGITAL PROCESSING SYSTEM

[75] Inventor: Paul R. N. Kellar, Newbury, England

[73] Assignee: Quantel Limited, Berkshire, England

[21] Appl. No.: 205,041

[22] Filed: Nov. 7, 1980

[30] Foreign Application Priority Data

Nov. 16, 1979 [GB] United Kingdom ............... 7939790

[51] Int. Cl.³ .............................................. H04N 5/22
[52] U.S. Cl. .................................... 358/182; 358/183
[58] Field of Search ................ 358/181, 182, 183, 185

[56] References Cited

U.S. PATENT DOCUMENTS

4,266,242 5/1981 McCoy ........................... 358/183 X

Primary Examiner—Robert L. Richardson
Attorney, Agent, or Firm—Dowell & Dowell

[57] ABSTRACT

A multiple picture image manipulation system for receiving video information related to a plurality of pictures. A designation control designates the output priority order of the respective pictures. A priority coder detects picture information having the higher priority present for producing a control signal indicating this detected priority, and a selector controlled by this signal outputs information from the plurality of pictures so as to select from only a single picture designated with the higher priority present where picture overlap occurs to provide a multiple picture image in which one of said pictures masks another without overlap degradation when displayed. Additional facilities for cross-fading following a change in the picture priority may also be included which pictures can have an associated border if desired.

17 Claims, 11 Drawing Figures

FADE OVER FROM 'OLD' TO 'NEW' STACK

(a) KEY WITHOUT BORDER
(b) KEY WITH BORDER

MULTIPLE IMAGE DIGITAL PROCESSING SYSTEM

BACKGROUND OF THE INVENTION

The present invention relates to the manipulation of a plurality of pictures, typically of reduced size.

In the known Quantel DPE 5000 digital production effects system, the capability of manipulating information from a single picture source is provided so as to facilitate visual effects such as picture size reduction, shift, freeze, tumble and spin under computer control using frame storage techniques. See also 'Picture processing system for television' (U.S. Pat. No. 4,163,249); 'Video Processing System' (U.S. Pat. No. 4,148,070) and 'Control Arrangement for Video Synchronisers' (U.S. Pat. No. 4,172,264).

OBJECT OF THE INVENTION

The present invention is concerned with providing a system capable of handling and manipulating, typically in real time, a number of pictures from different sources without allowing visual conflicts to occur between such manipulated pictures.

SUMMARY OF THE INVENTION

According to the invention there is provided a multiple picture image manipulation system comprising means for receiving video information related to a plurality of pictures; means for designating the output priority order of the respective pictures; means for detecting picture information having the higher priority present for producing a control signal indicating this detected priority; and selector means controlled by the signal from said detector means for selectively outputting information from the plurality of pictures so as to select from only a single picture designated with the higher priority present where picture overlap occurs to provide a multiple picture image in which one of said pictures masks another without overlap degradation when displayed.

The system preferably includes means for effecting change over gradually through several frame periods to provide a fade-over facility. These means may designate the information into luminance and chrominance components to allow preselected fractions of the overlapping data to be added during fade over in dependence on their designation.

Means may be provided for supplying data defining a border around one or more of the pictures which data accompanies the digital video data for that particular picture.

Further according to the invention there is provided a method of manipulating a multiple picture image comprising receiving video information related to a plurality of pictures, designating the output priority order of the respective pictures; detecting picture information having the higher priority present for producing a control signal indicating this detected priority; and outputting information from the plurality of pictures in dependence on the control signal so as to select from only a single picture designated with the higher priority present where picture overlap occurs to provide a multiple picture image in which one of said pictures masks another without overlap degradation when displayed.

BRIEF DESCRIPTION OF THE DRAWINGS

The invention will now be described by way of example with reference to the accompanying drawings in which.

DESCRIPTION OF PREFERRED EMBODIMENT

Figure 1:
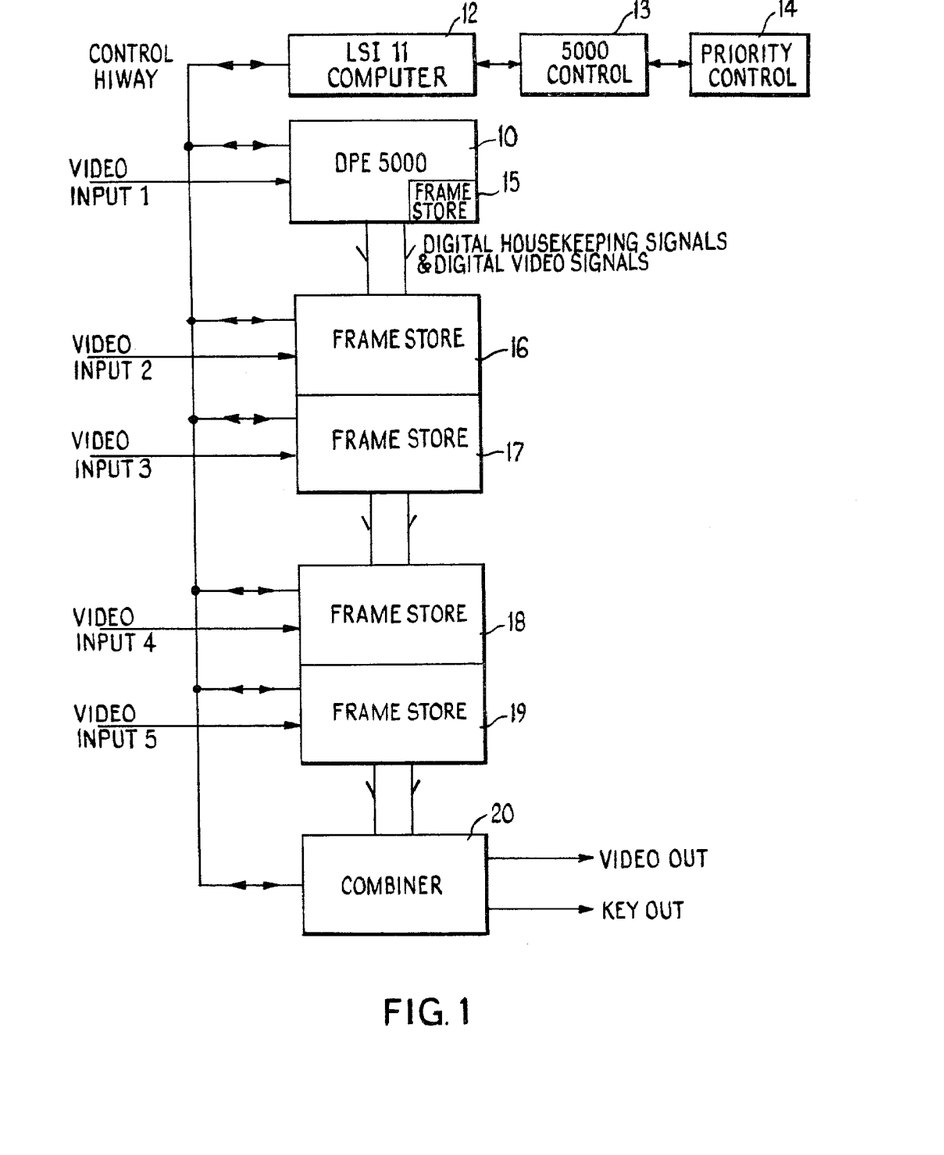
FIG. 1 shows the known DPE 5000 system to which various additional elements have been added to form an embodiment of the present invention.

In the system of FIG. 1 an embodiment of the invention with a capability of handling five picture sources is shown. Use in this particular arrangement is made of the existing DPE 5000 system by way of example.

The existing 5000 system comprises the processor 10 with integral frame store 15, which processor is driven by computer 12, the desired function being selected via control 13. In the present expanded system additional control is provided schematically by control block 14. This control block 14 can comprise for example a digital thumbwheel switch configuration to select the desired picture priority for controlling the system as described below. Alternatively this could be effected by a simple software function. The addition of a number of frame stores 16-19 provides a capability of five video inputs and other numbers of sources could be accommodated by changing the storage capability. Outputs from each of the frame stores 15-19 are received by a combiner unit 20 which produces a single combined output from the incoming multiple inputs by combining the images digitally. The existing processor 10 in addition to providing the frame store would also include therein an input decoder, read sequencer and oscillator, a write sequencer and oscillator, an analog to digital converter, an input processor, and after the frame store a digital to analog converter, an output processor, and an output coder. These have been omitted for the sake of clarity but such are known to those skilled in the art and from the above referenced patents for example, as is the way in which the computer and control can be interfaced and operate with the system. The additional frame stores 16-19 can each be provided as desired with an input decoder, a write sequencer and oscillator (fixed for enlargement and varying with compression), and an analog to digital converter and an input processor. The computer (e.g. LS1 11) together with the read side of the system is common to all stores. The digital housekeeping signals (read sequence and read oscillator information) is thus used by all the stores 15–20.

Figure 2:
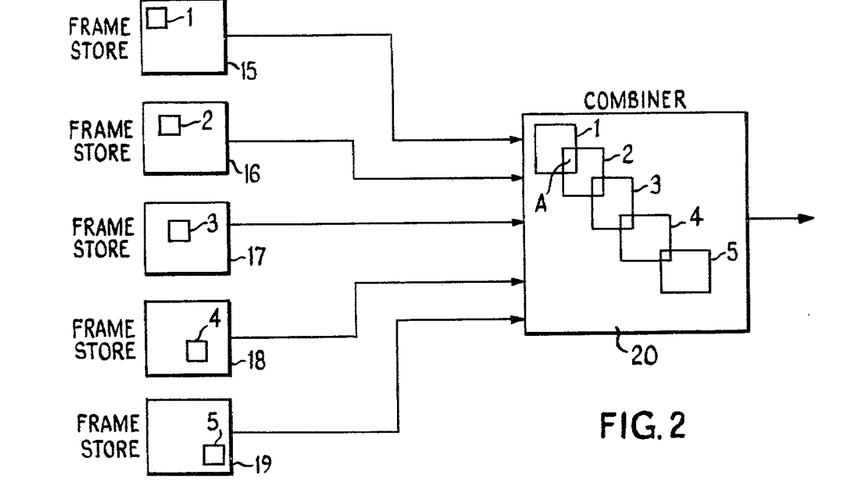
FIG. 2 shows the combiner processing requirement of FIG. 1.

The FIG. 2 arrangement shows the cooperation between the five frame stores 15–19 and the combiner 20. Each frame store is schematically shown as containing a reduced size picture, each picture being in a different relative frame position. The function of the selector is to handle each of the data inputs to provide a composite output which does not have degraded picture portions in those parts which overlap one another. It effectively provides a stacking order for the images in dependence on the order preselected and when this order is changed allows a change from one order to another to be achieved. Thus pictures 1 and 2 have an overlap portion A which, dependent on whether picture 1 or 2 has priority, will be made up of one of these pictures. In practice the video information received by combiner 20 not only comprises actual digital video data but includes a key bit which effectively defines the presence of the compressed picture (i.e. binary 1 for the key is only present within the compressed picture boundary), as is known heretofor.

Figure 3:
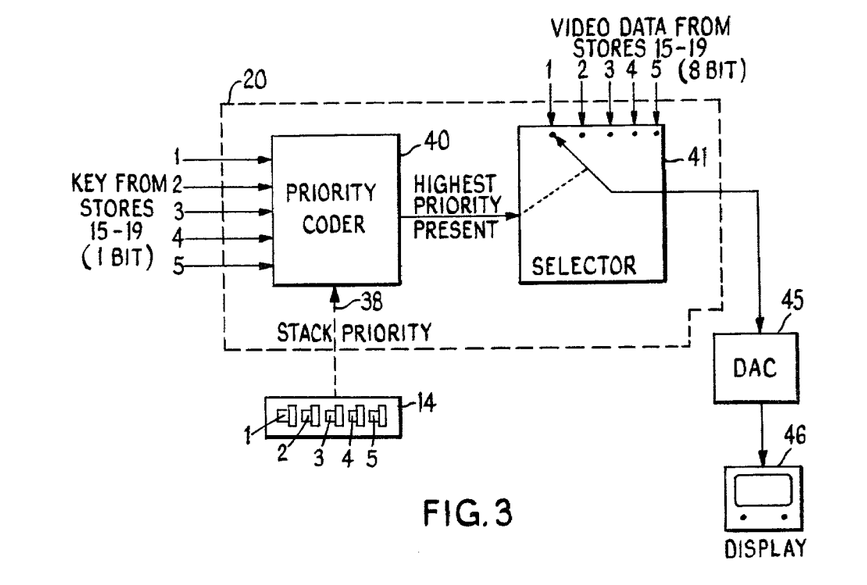
FIG. 3 shows one arrangement for providing the digital combiner function prior to conversion into analog form.

The basic combiner is shown in FIG. 3. The incoming key information is received by priority coder 40 which allows the key signal with the highest priority to pass through to the selector 41. The priority encoder may be constructed from standard TTL devices types 74151 and 74148. The priority selected is provided at input 38 (derived originally from the control 14 of FIG. 1). The control 14 is shown in this Figure as a plurality of thumbwheel switches. Taking that the stack priority is 1, 2, 3, 4 and 5 then the presence of the key from picture 1 will always be passed in preference to any other. If 1 is absent in that particular portion of the frame thus 2 will have priority and so on down to the picture with least priority that is present in that portion. The 8 bit data from each of the pictures is received by the selector 41 which effectively switches to the incoming picture with the highest priority present at any one time and outputs this picture data. The priority coder 40 is monitoring the key inputs picture point by picture point and when the picture with the highest priority is absent on the next picture point then the next highest present key will be determined and this change will effectively cause selector 41 to switch to that particular incoming picture. The selector output is shown passing via a digital to analog converter 45 to display 46. In this arrangement if a change in stack priority is chosen it is entered at input 38 and instantaneous switch over to the new priority will occur. Although the selector 41 is shown schematically as a mechanical switch, in practice this will typically employ known solid state switching techniques.

Figure 4:
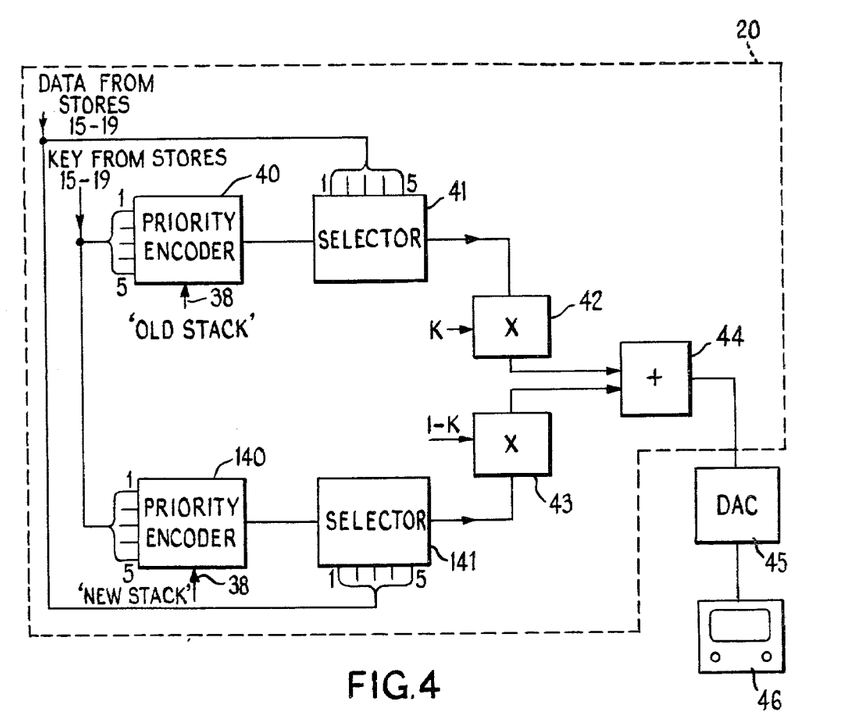
FIG. 4 shows an arrangement including a combiner for effecting a gradual change of priority to provide a fade over facility.

In the system of FIG. 4 an arrangement is shown which allows gradual change over of priority order to be achieved so as to provide a 'fade-over' facility where an overlying picture will dissolve through the underlying picture to be replaced by the lower picture at the portion of overlap.

Figure 5:
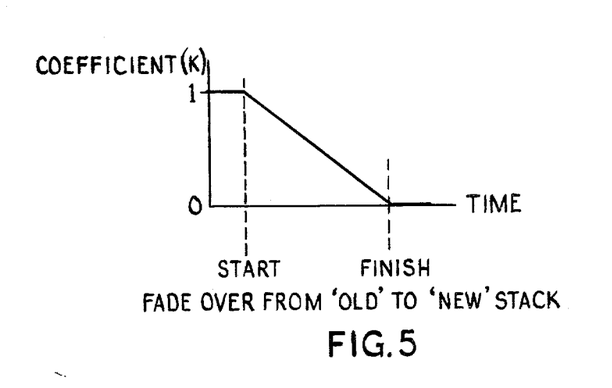
FIG. 5 shows the relationship between the selected coefficient between the start and finish of the fade over step.

In addition to the priority encoder 40 and selector 41 a further encoder 140 and selector 141 are provided. The output of selector 41 is received by digital multiplier 42 and that of selector 141 by multiplier 43. The multiplier outputs are received by adder 44 and this output is used for display via the DAC 45. As before encoder 40 provides an indication of the highest present channel (1 to 5) for that particular picture portion and this is used by selector 41 to switch to receive the correct data input. The output data from selector 41 is received by multiplier 42 which multiplies the data by a coefficient (K). Normally, when the control stack order is not being updated then K is chosen to be 1. The coefficient selected for use by the multiplier 43 is always chosen to be $1-K$ thus a zero output from multiplier 43 is provided when $K=1$. The output of adder 44 which effectively corresponds to the output of selector 41 passes to the display 46 via DAC 45. When a new stacking order is required then use is made of encoder 140 which has the new priority order entered and this will be used to control selector 141 in the same way as in selector 41. To achieve fade over the coefficient K is gradually reduced in value so that it begins as $K=1$ and progressively reduces in value till it reaches a value of $K=0$. This effectively gradually reduces the portion of the 'old' picture used and inversely increases the portion of the 'new' picture used until the old is entirely replaced by the new picture. A graphical representation of the fade over condition is shown in FIG. 5.

At the start $K=1$ and gradually reduces to zero. After fade over has been completed, the priority encoder 40 is available to be updated with a new stacking order if required and the fade over procedure can be repeated. It is to be noted that the change over of coefficient values need not follow the linear relationship against time shown by the slope of the FIG. 5 graph. The coefficient is generated together with the stacking order via the computer to effectively define the slope of the coefficient and thus the fade over rate and profile. The generation and use of coefficients in digital multipliers followed by addition is known from for example U.S. Pat. No. 4,163,249.

The present system has the capability from the system timing signals to be aware of the start and end of a frame for example and can provide via the computer an updated coefficient at the end of each frame, so that the fade over takes a predetermined number of frame periods as desired.

Although the example given has used pictures which are compressed relative to normal frame size the system would be capable of cross fading between two full size pictures. In this situation the key would be present through each entire picture. Distorted images (e.g. 'Autoflex') could also be handled.

In practice with broadcast T.V. the 8 bit data is normally colour coded video data comprising luminance and chrominance information in separate samples (Y, I and Q). It is necessary to ensure that chrominance data from one picture is added to chrominance data from another picture during fade over to avoid degradation and the adding of luminance to luminance data.

Figure 6:
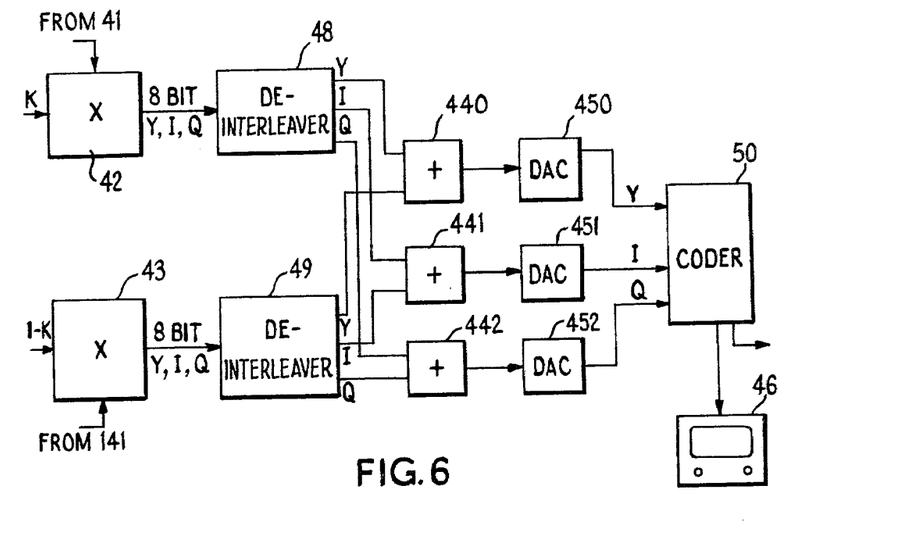
FIG. 6 shows an alternative arrangement to FIG. 4 where data is sectored into luminance and chrominance components.
Figure 7:
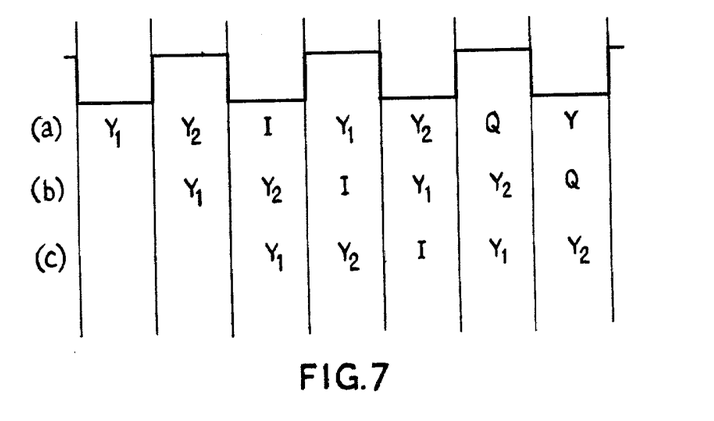
FIG. 7 shows typical relationship between data samples.

The FIG. 6 arrangement shows a system for handling the chrominance and luminance data. After the multipliers 42 and 43, rather than the data passing directly to adder 44 as in FIG. 4, the data is received by de-interleavers or separators 48 and 49 respectively employing standard latching techniques where the data is effectively temporarily held in one of three sectors in dependence on whether this is luminance or chrominance which samples may follow the sequence shown in FIG. 7(a) i.e. $Y_1$, $Y_2$, I, $Y_1$, $Y_2$, Q etc. Thus like samples are provided for each adder 440, 441, 442 and the added samples (the proportion of which being dependent on the selected coefficient K for the multipliers 42 and 43) pass via separate DACs 450, 451, 452. The analog information therefrom is processed in coder 50 to provide the composite video for use by the monitor 46 or elsewhere as desired. Thus this system can operate where there is a fixed relationship between the various pictures.

As the various pictures in each of the frame stores in this particular system can be controlled independently one to another typically in practice there is no fixed interrelationship between them. Thus in addition to each being of different relative sizes one or more may be tumbling or spinning whilst another may be scrolling and another can be frozen. If steps are not taken to ensure that the relationship between various pictures is known then picture degradation can occur.

In FIG. 7(a) the relationship between samples in a particular picture is shown. On the next row (b) it can be seen that the data has been scrolled by 1 picture point. The third row (c) shows a further picture point movement. Thus the relative phases of the interleaved data will change as the scrolling occurs relative to a non-scrolled picture and thus it is necessary to identify which sample is luminance or chrominance (Y, I or Q) when dealing with fade over to prevent degradation.

In practice it is possible to identify the data samples by generating an identification tag prior to manipulation to indicate whether the sample is I, Q or Y data. Two bits can be provided to accompany the video data through the system. The generation of such an identification tag is disclosed in U.S. Pat. No. 4,163,249. Use is now made of this identification data in the combiner system shown in FIG. 8.

Figure 8:
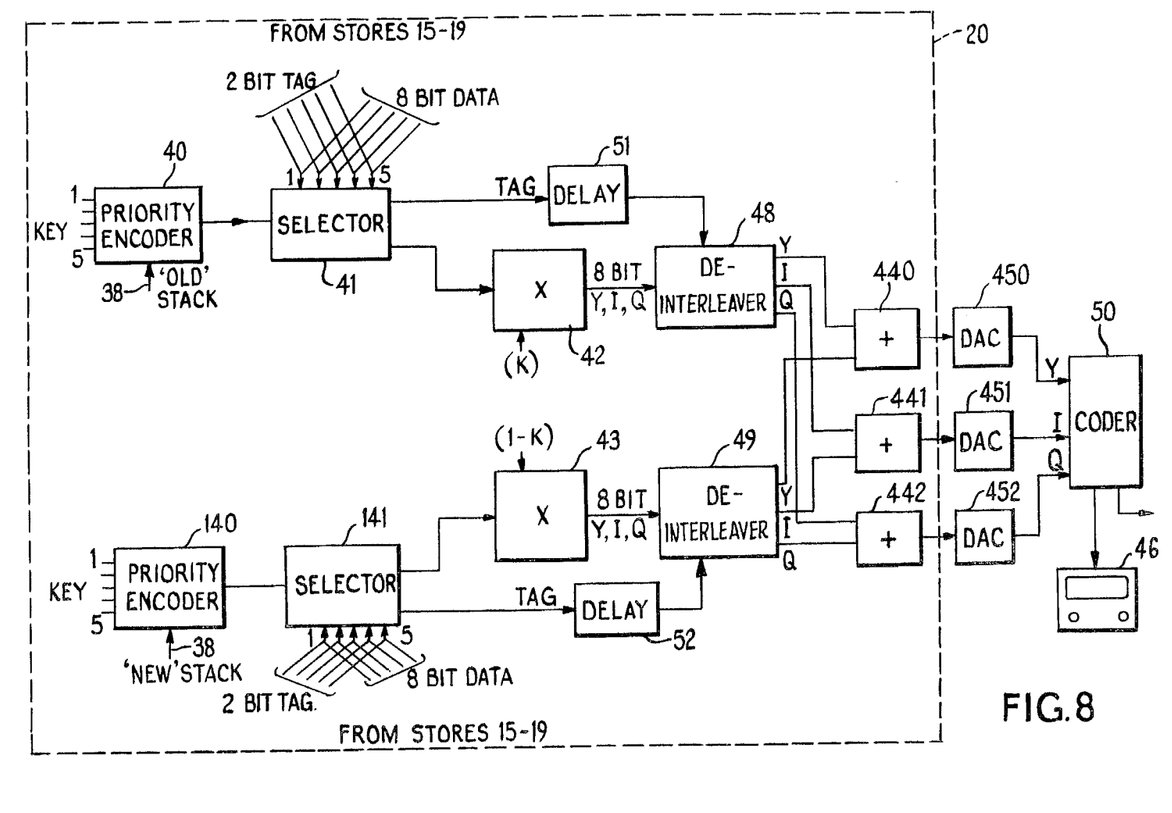
FIG. 8 shows additional elements from the FIG. 6 arrangement to handle identification data indicative of the luminance or chrominance component of the video information.

The data received by selector 41 and 141 of FIG. 8 will come from the respective frame stores and comprise 8 bits of video data together with 2 bits defining whether that data is chrominance or luminance information. In dependence on the priority previously selected in encoder 40 and on the presence of the key defining the picture area, the video data will be selected to pass to multiplier 42 and 43 respectively for multiplication by the selected coefficient value. At the same time the identification tag passes to the de-interleavers 48 and 49 via delay 51 or 52. The delay is chosen to ensure that the tag is delayed for a time equal to the time taken by the multiplier to effect the multiplication step (typically 140 nanoseconds). The de-interleaver sectors the data in dependence on its accompanying identification tag and thus the adders 440, 441 and 442 will handle Y, I and Q data respectively. The added data passes via DAC 450, 451 and 452 to the coder where syncs etc are inserted as required to provide the composite video data for use elsewhere in the studio.

BORDER

Figure 9:
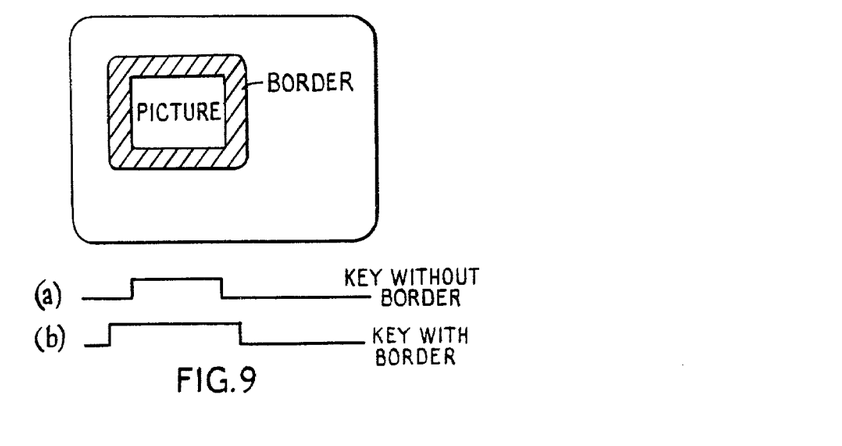
FIG. 9 shows a picture including a border and key signals provided thereby.
Figure 10:
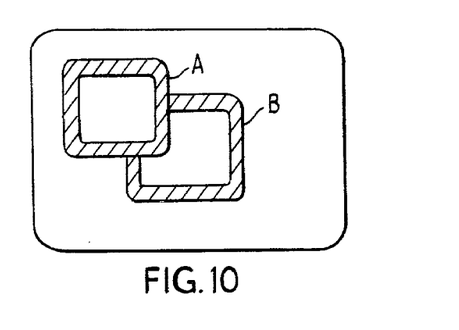
FIG. 10 shows the overlap of two pictures with borders added.

From the earlier system using a single picture source (DPE 5000) it is already known to include a border surrounding the compressed picture as shown in FIG. 9. The border is provided in a synthesised colour. In the present arrangement, by including border data as part of the data stream it is possible to handle the border as if it were ordinary picture data so that the key signal can be used to designate the presence or absence of the compressed picture with the border present. FIG. 9(a) shows the presence of the key without the border and 9(b) shows the key taking into account the border. Thus when the priority of the various pictures is selected no conflict arises with the borders and the typical resultant composite picture of FIG. 10 is produced with A having priority over B. (The other pictures of the stack are omitted for the sake of clarity).

Figure 11:
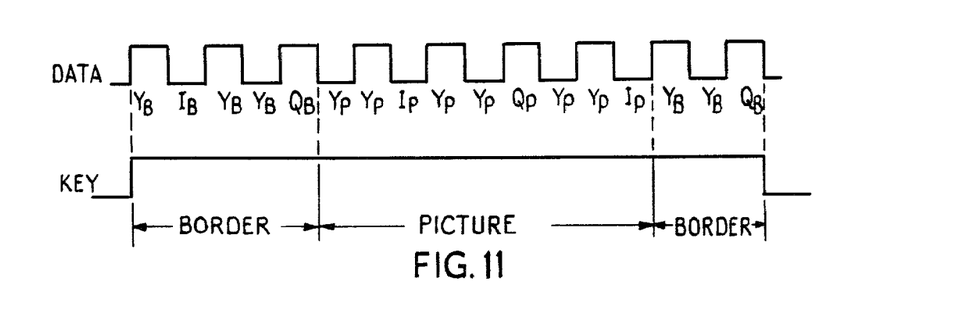
FIG. 11 shows data comprising border and normal video information.

FIG. 11 shows how the border can be generated. The three numbers ($Y_B$, $I_B$ and $Q_B$) come from the computer to define the size and composition of the synthetic colour of the border. The interfacing and operation of the computer with a system incorporating a frame store is known from U.S. Pat. No. 4,148,070 for example. The three generated numbers can be different for each of the channels and as this data is in digital form it can pass through the system as though it were normal video data without any problems arising. The border data is typically fixed whilst the video data is continuously changing to reflect live action (unless picture freeze has been selected). It is possible for the computer to gradually redefine the colour during fade over or independently (i.e. the border alone can fade over—colourwise). Naturally it is not necessary to include a border on each of the pictures being handled.

Although the system has been generally described as handling five picture sources this number can be increased or alternatively reduced to only two pictures in dependence on the system capability desired.

Whilst, the embodiment described has been shown cooperating with Quantel DPE 5000 processing system, the invention could be used in other configurations, such as digital video mixers.

Although the system can be used to handle pictures for normal broadcast television, the system can also be used to manipulate information derived from other video sources.

I claim:

1. A multiple picture image manipulation system comprising:
    a plurality of frame storage means for respectively receiving video information related to a plurality of pictures;
    means for designating the output priority order of the respective pictures from the respective frame storage means;
    means for detecting picture information having the highest priority present for producing a control signal indicating this detected priority; and
    selector means controlled by the signal from said detector means for selectively outputting information from the plurality of stored pictures held in said respective frame storage means so as to select from only a single picture designated with the highest priority present where picture overlap occurs to provide a multiple picture image in which one of the said pictures masks another without overlap degradation when displayed.

2. A system according to claim 1, wherein change over means are provided for effecting a change over from one picture arrangement to another in a predetermined period as a result of re-designating the output priority therebetween.

3. A system according to claim 2, wherein the change over means is adapted to effect the change over gradually through several frame periods to provide a fade over facility whereby an overlying picture dissolves through an underlying picture.

4. A system according to claim 2, wherein the change over means comprises at least one multiplier and at least one adder for multiplying information from respective pictures by a predetermined coefficient and summing the result.

5. A system according to claim 4, wherein separator means are provided to separate the information present into chrominance and luminance components so as to allow separate summations of the chrominance and luminance information from respective pictures.

6. A system according to claim 5, wherein delay means are provided to receive identification data indicative of chrominance or luminance information to present this identification data concurrently with picture information received by the separator means.

7. A system according to claim 4, wherein the information comprises digital video data and converter means are provided following summation to convert the data into analogue form and wherein coding means are provided to encode the data into composite video form.

8. A system according to claim 1, wherein generating means are provided to generate border information to accompany video information on at least one of the manipulated pictures.

9. A method of manipulating a multiple picture image comprising:
- receiving and storing respective frames of video information related to a plurality of pictures;
- designating the output priority order of the stored frames from the respective pictures;
- detecting picture information having the highest priority present for producing a control signal indicating this detected priority; and
- outputting information from the plurality of stored pictures in dependence on the control signal so as to select from only a single picture designated with the highest priority present where picture overlap occurs to provide a multiple picture image in which one of said pictures masks another without overlap degradation when displayed.

10. A method according to claim 9, including changing over from one picture arrangement to another in a predetermined period as a result of redesignating the output priority therebetween.

11. A method according to claim 10, wherein the change over is effected gradually over several frame periods to provide a fade over facility whereby an overlying picture dissolves through an underlying picture.

12. A method according to claim 10, wherein the change over is effected by multiplying information from respective pictures by a predetermined coefficient and summing the result.

13. A method according to claim 12, including separating the information present into chrominance and luminance components to allow separate summations of the chrominance and luminance information from respective pictures.

14. A method according to claim 13, including delaying identification data indicative of chrominance or luminance information to present this identification data concurrently with picture information at the separation step.

15. A method according to claim 12, wherein the information comprises digital video data and includes the steps of converting the data into analogue form following summation and encoding the data into composite form following the conversion step.

16. A method according to claim 9, wherein border information is generated to accompany the video information on at least one manipulated picture.

17. A system according to claim 1, wherein the detector means comprises a priority encoder for detecting the presence of picture information in the form of a keying signal provided from the respective frame store outputs.

* * * * *